Nov. 15, 1927.

F. BARCENA

INFLATABLE TIRE

Filed July 25, 1923

1,649,092

Witnesses:

Inventor:
Fernando Barcena

Patented Nov. 15, 1927.

1,649,092

UNITED STATES PATENT OFFICE.

FERNANDO BARCENA, OF VIGO, SPAIN.

INFLATABLE TIRE.

Application filed July 25, 1923, Serial No. 653,815, and in Spain February 2, 1923.

The invention relates to inflatable tires, and more particularly to that class of tires which are equipped with a supplemental air chamber.

It is an object of the invention to provide a tire in which a protective casing surrounds the supplementary air chamber and is secured to the felly of the wheel.

A further object consists therein that the protective casing for the supplementary air chamber is secured to the felly and to an intermediate portion of the wheel disk, the latter forming with a portion the complement of said casing.

Figure 1:
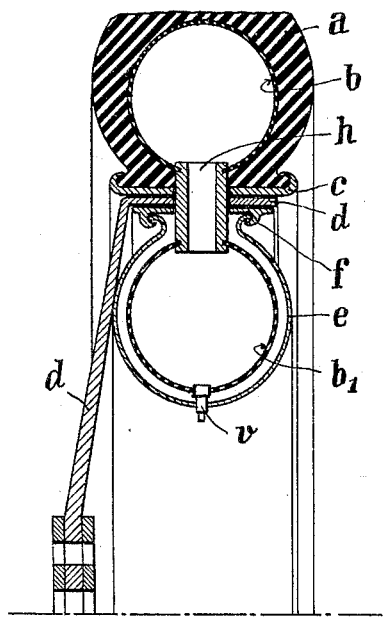
Figure 2:
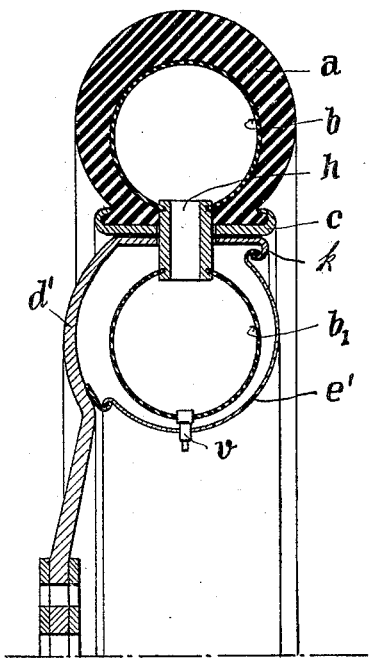

With these and other objects in view, the invention comprises the means described in the following specification, particularly pointed out in the claim forming a part thereof, and illustrated in the accompanying drawing, in which, Figure 1 is a fragmentary section through a disk wheel to which my invention has been applied; and, Figure 2 is a similar section of a modification.

Referring to Figure 1 of the drawing, the wheel includes a disk $d$ which at the circumference is bent to provide a horizontal flange constituting the felly. On the latter is mounted a rim $c$ to which is secured a tire casing $a$, which is hollow to provide a main air chamber $b$. To the inner side of the felly is secured an interior felly band $f$ which carries an annular protective casing $e$. The latter houses a rubber hose $b_1$, constituting a supplementary air chamber which is placed in communication with the air chamber $b$ through a tube $h$. A valve $v$ affords means for admitting air to the chamber $b_1$.

In the modification shown in Figure 2, the interior felly band is dispensed with. The protective casing for the supplemental air chamber is afforded by the disk $d'$ of the wheel and by a curved plate $e'$ which at one end is secured to an intermediate portion of the disk $d'$, and at the other end is secured to the felly $k$ which is formed integral with the disk. Thus, the plate $e'$ complements a portion of the disk and the felly to provide a casing for the supplemental air chamber. The construction and operation of this modification is in all other respects the same as in the first described embodiment.

While the drawing shows the preferred embodiment of the invention, numerous changes and alterations may be made without departing from the spirit of the invention. I, therefore, do not wish to limit myself to the particular details as shown, but wish to include all changes, alterations, modifications, revisions and re-arrangements constituting departures within the scope of the invention, as defined in the appended claim.

I claim:

In a vehicle disk wheel, the combination with a felly formed integral with the wheel disk, of a tire having an air chamber and mounted on said felly, a supplementary air chamber mounted interiorly of said felly, means for placing the air chambers in communication and a protective casing surrounding said supplementary chamber, and secured to said felly and to an intermediate portion of the said wheel disk, the latter forming with a portion the complement of said casing.

FERNANDO BARCENA.